United States Patent Office 3,720,634
Patented Mar. 13, 1973

3,720,634
ORGANIC HEXAFLUOROPHOSPHATES, ARSENATES OR ANTIMONATES AS ACCELERATORS FOR CURING EPOXY RESINS
Gary L. Statton, Wallingford, Pa., assignor to Atlantic Richfield Company, Philadelphia, Pa.
No Drawing. Filed Jan. 19, 1971, Ser. No. 107,850
Int. Cl. C08g 45/00
U.S. Cl. 260—18 PF
18 Claims

ABSTRACT OF THE DISCLOSURE

A process for preparing curable thermoset resins from polyepoxides and organic anhydrides with or without polyols in the presence of organic hexafluorophosphates, hexafluoroarsenates or hexafluoroantimonates which serve as accelerators resulting in shorter gel times with more thorough cure at lower temperatures than obtained with presently recognized accelerators.

BACKGROUND OF THE INVENTION

It is well recognized that polyepoxide compounds can be cured with polycarboxylic acid anhydride to form useful thermoset resins in such applications as moldings, castings, laminates, and coatings. Anhydride-cured epoxy resins generally exhibit improved high temperature stability over the amines and better physical and electrical properties above their deflection temperature. These formulations generally require elevated temperature cures with ultimate properties depending upon the post-cure temperature.

Reaction of the anhydride with the polyepoxide is complex and dependent on a number of factors: gel time and temperature, post-cure time and temperature, presence of accelerator, type of accelerator, ratio of anhydride to epoxy, to mention a few.

In the absence of accelerators the anhydride will not react directly with the epoxy; however when hydroxyl groups are present on the resin chain the anhydride will react with them to produce carboxylic acid. This will then react with the epoxy group to generate additional hydroxyls capable of reacting with the additional anhydride groups.

The variety of accelerators suggested for anhydride cures is considerable. Tertiary amines have been widely used as have diglycols and a variety of mercaptan containing compounds. Phenols have been reported as accelerators as have the reaction products of phenol with a tertiary amine or a quaternary ammonium hydroxide. Organophosphines have been used for blends of aliphatic and aromatic glycidyl ether resins and stannous octoate has found some commercial acceptance as an accelerator.

OBJECTIVES

It is an objective of this invention to provide a process whereby 1,2-polyepoxides and organic anhydrides can be gelled at ambient temperatures through selection of a suitable accelerator.

A further objective is to provide an accelerator which will cause polyepoxides and organic anhydrides to gel in a shorter time than obtained using recognized prior art accelerators under the same temperature conditions.

It is another objective to provide an accelerator for preparing curable thermoset resins from polyepoxides and organic anhydrides that will result in a more thoroughly cured product when subjected to long cure schedules.

The attainment of these and other objectives will be better understood from the disclosure and examples which follow.

THE INVENTION

The polyepoxides which can be used in my invention to produce cured compositions may be saturated or unsaturated; and they can be aliphatic, cycloaliphatic, aromatic or heterocyclic. They can be substituted with substituents such as halogens, hydroxyl groups, ether radicals and the like. The polyepoxides are exemplified by the following:

epoxidized mono-, di, and triglycerides
butadiene dioxide
vinylcyclohexene diepoxide
1,4-bis(2,3-epoxypropoxy)benzene
dicyclopentadiene diepoxide
diglycidyl ether
1,2,5,6-diepoxyhexane
1,8-bis(2,3-epoxypropoxy)cyclohexane
3,4-epoxy-6-methylcyclohexyl-methyl-3,4-epoxy-6-methyl-cyclohexane carboxylate
dipentene dioxide
bis(3,4-epoxy-6-methyl-cyclohexylmethyl)adipate
polyallyl glycidyl ether Also included are: epoxides derived from natural oils such as linseed oil epoxide, soybean oil epoxide, safflower oil epoxide, tung oil epoxide, castor oil epoxide, and lard oil epoxide which are glycerides containing 45 to 80 carbon atoms.

Other polyepoxides include the polyglycidyl polyethers of polyhydric phenols which are prepared by the reaction of halohydrins such as monohalohydrins, polyhalohydrins, epihalohydrins and the like with polyhydric phenols by methods known in the art. Preferred polyglycidyl ethers are those prepared by the reaction of epichlorohydrin and bisphenol A (2,2-bis(hydroxyphenyl)propane), resorcinol, catechol, trihydroxytriphenyl, 4,4-dihydroxybenzophenone and the like.

All polycarboxylic acid anhydrides or organic anhydrides can be used in the practice of this invention. They include succinic anhydride
glutaric anhydride
propylsuccinic anhydride
methylbutylsuccinic anhydride
hexylsuccinic anhydride
pentenylsuccinic anhydride
maleic anhydride
chloromaleic anhydride
itaconic anhydride
hexahydrophthalic anhydride
hexachlorophthalic anhydride
tetrahydrophthalic anhydride
chlorendic anhydride
tetrabromaphthalic anhydride
phthalic anhydride
nadic methyl anhydride
heptylsuccinic anhydride
octenylsuccinic anhydride
nononylsuccinic anhydride
alpha,beta-diethylsuccinic anhydride dibromomaleic anhydride
citraconic anhydride
methyltetrahydrophthalic anhydride
tetraiodophthalic anhydride
4-nitrophthalic anhydride
1,2-naphthalic anhydride
polyazelaic polyanhydride
polysebacic polyanhydride
pyromellitic dianhydride
trimellitic anhydride
cyclopentanetetracarboxylic dianhydride
glycerol tristrimellitate, and the like. Mixtures of the anhydrides can also be used.

In many applications it is desirable that the cured system have more flexibility or impact resistance than can be obtained from a polyepoxide-organic anhydride composition alone. In order to obtain such properties it may be necessary to include polyols in the composition. Suitable polyols include ethylene glycol, propylene glycol, glycerine, trimetholylpropane, pentaerythritol, diethylene glycol, dipropylene glycol, 12,13-tetracosane diol, sorbitol, polyvinyl alcohol, cyclohexane diols, 2,3-dibromocyclohexanediols, resorcinol, catechol, bis(4-hydroxyphenyl) methane bis(4-hydroxyphenyl)-2,2-propane, butane diols, pentane diols, high molecular weight polyols as polyoxyethylene polyols, polyoxypropylene polyols, polyester polyols and hydroxyl terminated polybutadienes.

The accelerators which I have found satisfactory in attaining the objectives set forth earlier fall within the classification or organic hexafluorophosphates, hexafluoroarsenates and hexafluoroantimonates of the formula R—MF$_6$ wherein R can be acyl or aroyl radicals or a radical having the formula

wherein R$_1$ and R$_2$ are substituted or unsubstituted aryl groups and R$_3$ is H or a substituted or unsubstituted aryl group.

Acyl and aroyl compounds include:

benzoyl hexafluoroarsenate
bromoacetyl hexafluoroarsenate
acetyl hexafluorophosphate
trichloroacetyl hexafluoroarsenate
t-butylacetyl hexafluorophosphate
butyryl hexafluoroantimonate
α-chlorophenylacetyl hexafluoroantimonate
propionyl hexafluoroarsenate
decanoyl hexafluorophosphate
octanoyl hexafluoroarsenate
p-chlorobenzoyl hexafluoroantimonate
o-fluorobenzoyl hexafluoroarsenate
p-nitrobenzoyl hexafluorophosphate
p-tolyoyl hexafluorophosphate
m-trifluoromethylbenzoyl hexafluorophosphate
3,4,5-trimethoxybenzoyl hexafluoroantimonate
crotonyl hexafluorophosphate Specific examples of the R$_1$, R$_2$, R$_3$, CMF$_6$ accelerators include triphenylmethyl hexafluorophosphate
diphenylmethyl hexafluorophosphate
diphenyltolylmethyl hexafluorophosphate
phenylditolylmethyl hexafluorophosphate
triphenylmethyl hexafluoroarsenate
diphenylmethyl hexafluoroarsenate
diphenyltolylmethyl hexafluoroarsenate
phenylditolylmethyl hexafluoroarsenate
triphenylmethyl hexafluoroantimonate
diphenylmethyl hexafluoroantimonate
diphenyltolylmethyl hexafluoroantimonate
phenylditolylmethyl hexafluoroantimonate
tritolylmethyl hexafluoroantimonate
(o-fluorophenyl)phenylmethyl hexafluorophosphate
(p-nitrophenyl)diphenylmethyl hexafluorophosphate
(m-cyanophenyl)diphenylmethyl hexafluoroarsenate
bis(o-fluorophenyl)tolylmethyl hexafluoroantimonate
bis(o-chlorophenyl)phenylmethyl hexafluorophosphate
(4-bisphenyl)ditolylmethyl hexafluoroarsenate
(p-butylphenyl)diphenylmethyl hexafluorophosphate
tri(α-naphthyl)methyl hexafluoroarsenate, and the like.

In practicing this invention the phosphates, arsenates and antimonates selected as accelerator should be present in an amount between 0.0005 and 2.0 weight percent and preferably between 0.001 and 1.2 weight percent with respect to the total weight of the curable epoxide composition. The accelerator can be dissolved into a suitable solvent and mixed with the epoxy-anhydride or epoxy-anhydride-polyol mixture. Typical solvents include organic ethers:

diethyl ether
isopropyl ether
n-butyl ether
n-butyl vinyl ether
allyl glycidyl ether
chloromethyl methyl ether
dipropylene glycol
allyl phenyl ether
p-dioxane
2,6-dimethyl-pyrone
dihydropyran
2,5-dihydrofuran
tetrahydrofuran
2-methylfuran
3-methyl tetrahydrofuran
oxepane
tetrahydropyran organic ketones:

acetone
2-butanone
2-octanone
di-n-hexyl ketone
2,4-dimethyl-3-hexanone
acetonylacetone
cyclohexanone
cyclopentenone
chloro-2-propanone nitroparaffins:

nitromethane
nitroethane
1-nitropropane
2-nitropropane
1-nitrohexane
2-nitrododecane The amount of catalyst and the amount and nature of the solvent effect the gel time and cure rate of the compositions therefore selection can be based on anticipated use for the product. Especially preferred for lower temperature curing is tetrahydrofuran which may serve as solvent and cocatalyst for the organic hexafluorophosphorus, arsenic, and antimony salts. When the accelerator is dissolved in a solvent good results are obtained by utilizing between 0.001 and 20 percent, preferably 0.005 and 10 percent of catalyst and solvent based on the total weight of the curable epoxide composition.

The mixture of epoxide composition and catalyst can be cured over a wide temperature range of from 10° to 250° C., preferably 20–150° C. and may be employed as single curing temperatures or combinations of temperatures.

Curable mixtures containing the epoxide compounds and the polycarboxylic acid anhydride can provide valuable resins when the mixtures contain such amounts of polycarboxylic acid anhydride and epoxide compound as to provide .01 to 10.0 and preferably 0.2 to 3.0 carboxy equivalent of the anhydride for each epoxy group contained in the epoxide compound.

Thermoset resins can be prepared from the above epoxyanhydride compositions with polyols added by providing .01 to 10 and preferably 0.1 to 2.0 hydroxyl groups of the polyol for each epoxy group contained in the epoxide compound.

The epoxide compositions can be mixed in any convenient manner after which the accelerator is then stirred in.

The following examples illustrate the benefits derived from practice of the invention; however, they are not intended to be all-inclusive, nor limit the scope of the teaching herein. Hardness values were determined by the use of a Shore D durometer. Determination of the percent of epoxide entering into the reaction was determined by infrared measurement.

Example 1.—13.6 grams dicyclopentadiene diepoxide and 6.6 grams maleic anhydride were melted and charged into an aluminum dish with 1.06 grams glycerol. After thoroughly mixing the constituents, the temperature was maintained at 80° C. The composition required over 5 hours to gel and only 66 percent of the epoxide had reacted.

Example 2.—To the mixture of Example 1, stannous octoate, a recognized accelerator, was added and the gel time was reduced to 5 hours.

Example 3.—To the mixture of Example 1, dimethylbenzyl amine, a recognized accelerator, was added and the gel time was reduced to 3.5 hours.

Example 4.—0.15 part per hundred parts of resin (p.h.r.) of triphenylmethyl hexafluorophosphate dissolved in 1 ml. acetone (equivalent concentration of catalyst as added in Examples 2 and 3) was added to the mixture of Example 1. The resin gelled in 1 hour and analysis indicated that 80 percent of the epoxide had reacted.

Example 5.—The epoxy composition of claim 1 was further cured for six hours at 120° C. and then 6 hours at 160° C. Analysis indicated that only 81 percent of the epoxide reacted.

Example 6.—0.075 p.h.r. triphenylmethyl hexafluoroarsenate was dissolved in 1 ml. acetone and mixed with a resin composition as in Example 1. The mix gelled in 3 hours and was further cured for 6 hours at 120° C. followed by 6 hours at 160° C. as in Example 5. Analysis indicated that 85 percent of the epoxide had reacted.

Examples 7 through 12 exemplify the effect on time and nature of gelling and curing which can be obtained through selection of type and amount of solvent into which the organohexafluorometal is dissolved. In these examples, an epoxy-anhydride composition consisting of 6.75 g. of a diglycidyl ether of bisphenol A having an epoxy equivalent weight of 182–195 and 5.75 g. of hexahydrophthalic anhydride were mixed with 0.5 p.h.r. of triphenylmethane hexafluorophosphate dissolved in varying proportions of solvent.

carboxylic acid anhydride in the presence of an organic salt having the formula

wherein M is selected from phosphorus, arsenic or antimony and R is an acyl, aroyl or a radical of the formula

wherein $R_1$ and $R_2$ are aryl groups and $R_3$ is H or an aryl group.

2. The process of claim 1 wherein the organic salt is present in an amount between 0.0005 and 2.0 weight percent with respect to the total weight of the curable epoxide composition.

3. The process of claim 2 wherein the organic salt is present in an amount between 0.001 and 1.2 weight percent with respect to the total weight of the curable epoxide composition.

4. The process of claim 2 wherein the organic salt is dissolved in a solvent selected from the group consisting of organic ethers, organic ketones and nitroparaffins, and wherein the salt and solvent are present in the range of 0.001 to 20.0 weight percent based on the total weight of the curable epoxide composition.

5. The process of claim 4 wherein the organic salt and solvent are present in an amount between 0.005 and 10.0 weight percent with respect to the total weight of the curable epoxide composition.

6. The process of claim 4 wherein the solvent is tetrahydrofuran.

7. The process of claim 2 wherein R is a diphenylmethyl.

8. The process of claim 2 wherein R is tritolylmethyl.

9. The process of claim 2 wherein R is acetyl.

10. The process of claim 2 wherein R is benzoyl.

11. The process of claim 2 wherein M is antimony.

12. The process of claim 2 wherein M is arsenic.

13. The process of claim 2 wherein M is phosphorus.

14. The process of claim 2 wherein the organic salt is triphenylmethyl hexafluoroarsenate.

15. The process of claim 2 wherein the organic salt is triphenylmethyl hexafluorophosphate.

16. The process of claim 2 wherein the organic salt is triphenylmethyl hexafluoroantimonate.

17. The process of claim 1 wherein a polyol is added to the curable resin.

| Example | Solvent | | Gel time at 25° C. | Shore D Hardness | | |
|---|---|---|---|---|---|---|
| | Name | Grams | | After 24 hrs. at 25° C. | After 1 hr. at 115° C. | After 144 hrs. at 25° C |
| 7 | Tetrahydrofuran | 0.44 | 6 min | 29 | | 58 |
| 8 | do | 0.88 | 17 min | 24 | | 64 |
| 9 | do | 1.32 | 30 min | | 72 | |
| 10 | do | 2.64 | 45 min | | 70 | |
| 11 | Dioxane | .88 | >3.5 hrs | 12 | | 52 |
| 12 | Nitropropane | .90 | >6 hrs | 0 | | 0 |

Reference: H. Lee and K. Neville, Handbook of Epoxy Resins, McGraw-Hill Book Co., New York, N. Y., 1967.

I claim:

1. A process for preparing and curing epoxy resins comprising reacting a 1,2-polyepoxide with an organic poly- 18. A curable composition comprising a 1,2-polyepoxide, an organic polycarboxylic acid anhydride and an amount between 0.0005 and 2.0 weight per cent with respect to the total weight of the curable epoxide composition of an organic salt having the formula

wherein M is selected from phosphorus, arsenic or antimony and R is an acyl, aroyl or a radical of the formula

wherein $R_1$ and $R_2$ are aryl groups and $R_3$ is H or an aryl group.

References Cited

UNITED STATES PATENTS

| | | | |
|---|---|---|---|
| 3,542,828 | 11/1970 | Harris | 260—2 A |
| 3,296,202 | 1/1967 | Schmitz-Josten et al. | 260—47 EA |
| 3,539,532 | 11/1970 | Harvey | 260—47 EC |

WILLIAM H. SHORT, Primary Examiner

T. E. PERTILLA, Assistant Examiner

U.S. Cl. X.R.

260—2 EC, 2 EA, 30.4 EP, 32.4 EP, 32.8 EP, 47 EC, 47 EA, 75 EP, 78.4 EP, 835, 837 PV